2 Sheets—Sheet 1.

G. GILBERT.
Machine for Finishing Nail Rods.

No. 201,002. Patented March 5, 1878.

WITNESSES:
Saml. J. Van Stavoren
Jos. B. Connolly

INVENTOR
George Gilbert
By Connolly Bros ATTORNEYS.

N. PETERS, PHOTO-LITHOGRAPHER, WASHINGTON, D. C.

2 Sheets—Sheet 2.

G. GILBERT.
Machine for Finishing Nail Rods.

No. 201,002. Patented March 5, 1878.

WITNESSES:
Saml. J. Van Stavoren
Jos B Connolly

INVENTOR
George Gilbert
By Connolly Bros. ATTORNEYS.

N. PETERS, PHOTO-LITHOGRAPHER, WASHINGTON, D C.

UNITED STATES PATENT OFFICE.

GEORGE GILBERT, OF PHILADELPHIA, PENNSYLVANIA, ASSIGNOR TO WM. AND HARVEY ROWLAND, OF SAME PLACE.

IMPROVEMENT IN MACHINES FOR FINISHING NAIL-RODS.

Specification forming part of Letters Patent No. 201,002, dated March 5, 1878; application filed September 20, 1877.

*To all whom it may concern:*

Be it known that I, GEORGE GILBERT, of Philadelphia, in the county of Philadelphia and State of Pennsylvania, have invented a certain new and useful Machine for Finishing Nail-Rods; and I do hereby declare the following to be a full, clear, and exact description of the invention, such as will enable others skilled in the art to which it pertains to make and use it, reference being had to the accompanying drawings, which form part of this specification, and which show in—

Figure 1:
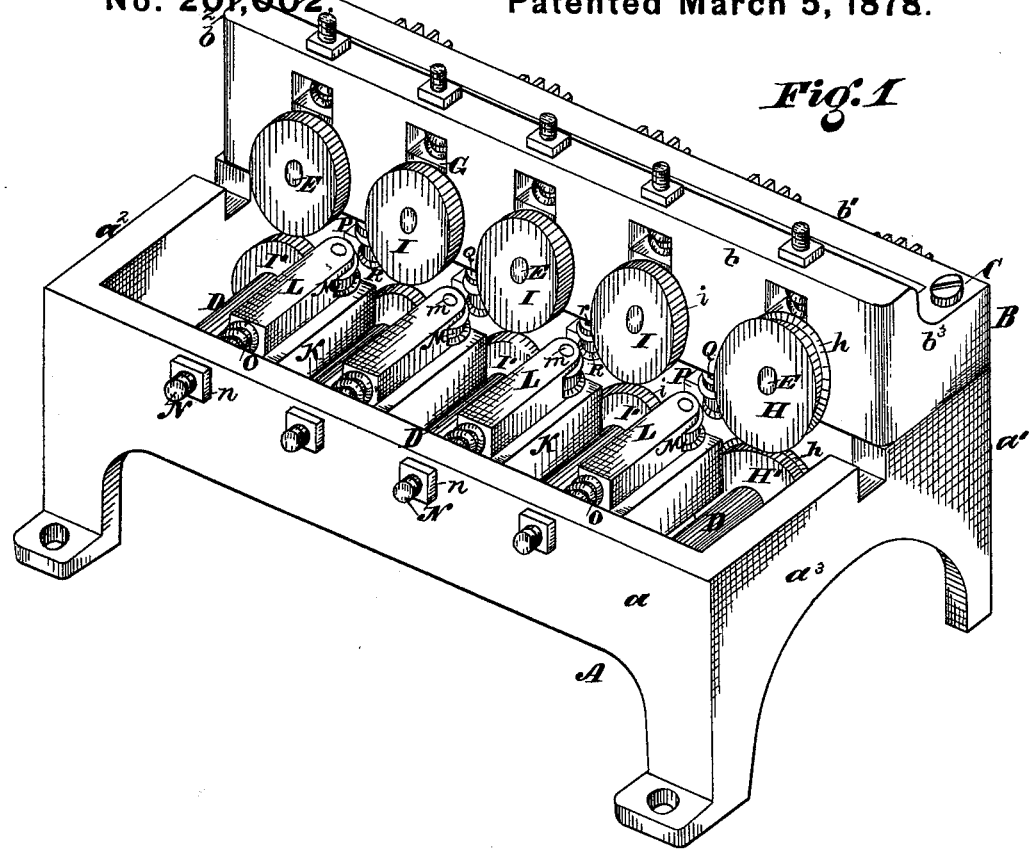
Figure 2:
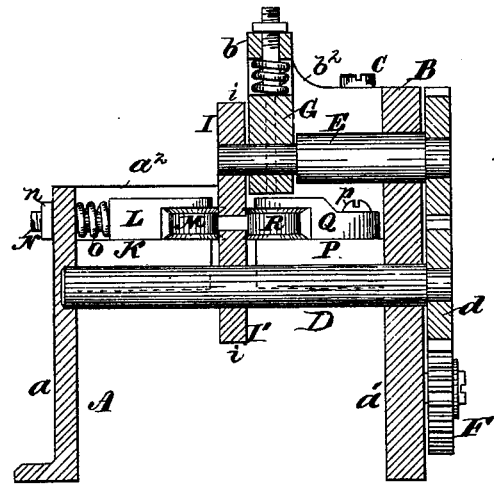
Figure 3:
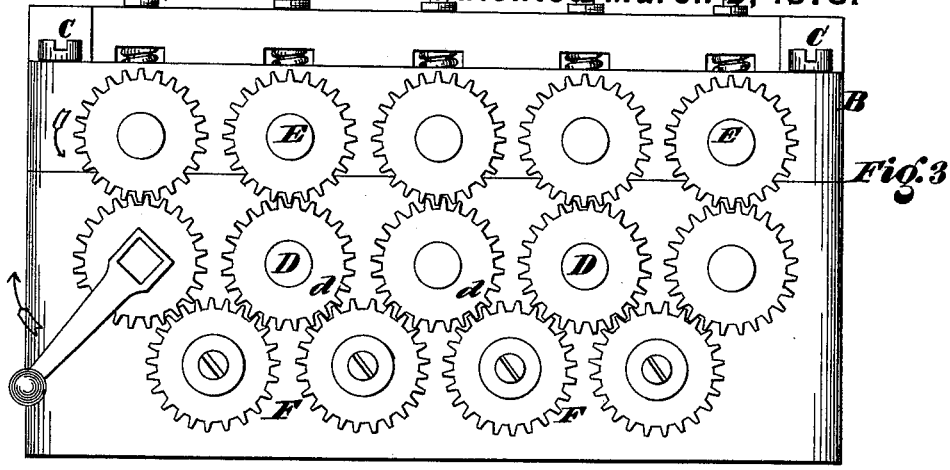
Figure 4:
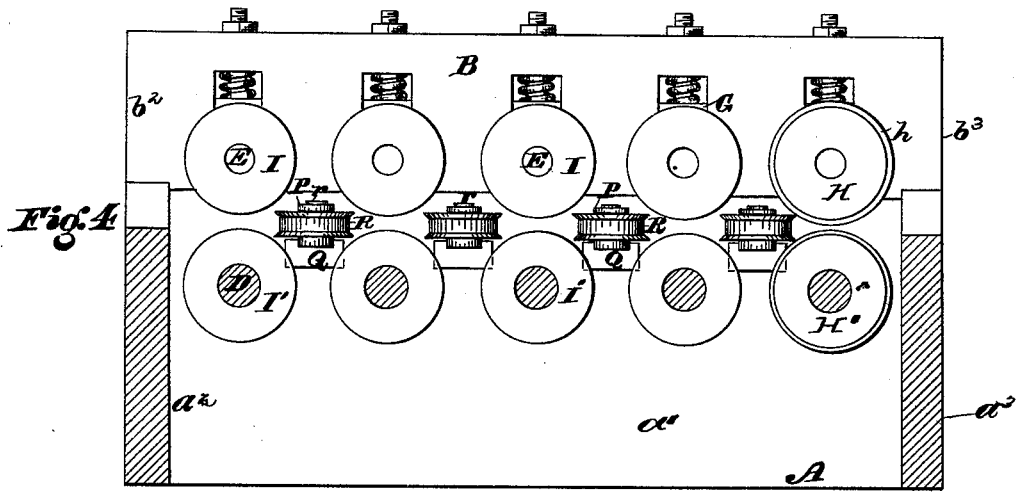
Figure 5:
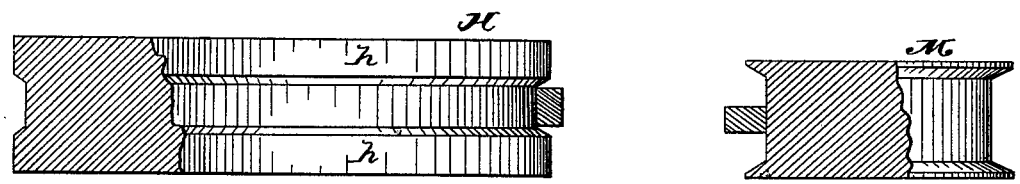

Figure 1 a perspective view, Fig. 2 a transverse vertical section, Fig. 3 a side elevation, and Fig. 4 a longitudinal vertical section, of my invention, and Fig. 5 a detail view of the rolls.

The object of my invention is to provide a machine for finishing the slit rods from which horseshoe-nails are made.

My invention consists of the machine herein described, which is presented as being an improvement upon machines conceded to be old, in which are embraced in one class flanged rolls arranged alternately vertically and horizontally, and in another class rolls arranged in the same manner and provided with yielding bearings. The nature of my improvements upon these machines will be understood from the claims, which are confined to what I hold to be novel and of my invention.

Referring to the accompanying drawings, A indicates the main frame of the machine, composed of two sides, $a$ $a^1$, and two end pieces, $a^2$ $a^3$, respectively. B is a supplementary frame, composed of sides $b$ $b^1$ and ends $b^2$ $b^3$, sustained on the main frame A, and fastened thereto by bolts or screws C C. D D represent horizontal shafts extending across the frame A, having fixed bearings in the sides $a$ $a^1$, and being provided with gear-wheels $d$ $d$. E E are similar shorter shafts mounted in the frame B, in line over and parallel with the shafts D D. All of the shafts D D turn in one or the same direction, while all of the shafts E move in the opposite direction, as shown by the arrows in Fig. 3, this result being accomplished by means of the idle gear-wheels F F, which mesh with the gears $d$ $d$.

The shafts E E have fixed bearings in the side $b^1$ of the frame B and yielding or spring bearings or boxes G in the side $b$ of said frame. H H' and I I' are rollers mounted on and turning with the shafts D E, the rollers H H' being flanged, as shown at $h$ $h$, while the rollers I I' have plain faces or peripheries $i$ $i$. K K are beams projecting inwardly from the side $a$ of the frame A, their upper sides being channeled or grooved to form ways or guides for boxes L L, in which are sustained flanged rollers M M turning on vertical axes $m$ $m$. N N are screw-rods passing from said boxes, to which they are secured, through the side $a$, where they are provided with nuts $n$ $n$. O O are spiral springs surrounding the rods N N, between the boxes L L and side $a$ of the frame A. P P are beams projecting inwardly from the side $a^1$ of the frame A, in line with the beams K K. On these beams P P are rigidly secured, by screws or bolts $p$ $p$, boxes or bearings Q, holding flanged rollers R R turning on vertical axes $r$ $r$.

Operation: The rod to be operated upon is passed between the pair of rolls H H', the flanges of which prevent it leaving them laterally. Before the rod has been fed through said rolls far enough to bend upwardly it is seized by the first pair of flanged rollers M R, whence it is carried to the first pair of rolls I I', and thence onward through the machine. This passage of the rod has the effect of straightening, flattening, and smoothing it, the rolls H H' I I' acting upon the flat sides and the rolls M R upon the edges of said rod, reducing burrs and any and all other unevenness of surface which may exist.

The object of the spring-bearings is to press the rolls against the rod with sufficient force to reduce down or flatten out the burrs on the latter, permitting said rolls to spread or yield before drawing out the rod.

It will be observed that the several rolls are arranged in pairs, one roll of each pair having a rigid bearing and being opposed to a roll in a spring or yielding bearing; also that the pairs of rolls on horizontal shafts alternate with those on vertical axes; and that all the rolls are so arranged that a rod passed through or between them will be carried along in a straight horizontal line.

What I claim as my invention is—

1. A machine for finishing nail-rods, having a series of rolls on horizontal shafts and another alternating series of rolls on vertical shafts, arranged respectively in pairs, one shaft of each pair having a yielding spring-bearing, while the other shaft of same pair has a fixed bearing, the initial pair of rolls on horizontal shafts being flanged to constitute guides, while the others of the same series have plain peripheries, as shown and described, and for the purpose specified.

2. In combination with rolls H H' I I' on horizontal shafts, flanged rolls M R on vertical axes, and alternating with the first-named rolls, substantially as shown and described, said rolls being arranged in pairs, one shaft of each pair having a yielding spring-bearing and the other a fixed bearing, as set forth.

In testimony that I claim the foregoing I have hereunto set my hand this 1st day of September, 1877.

GEO. GILBERT.

Witnesses:
SAML. J. VAN STAVOREN,
CHAS. F. VAN HORN.